United States Patent
Maher (10) Patent No.: US 6,328,051 B1
(45) Date of Patent: Dec. 11, 2001

(54) DUAL PENDULUM VALVE ASSEMBLY

(75) Inventor: Joseph Maher, Wenham, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/606,382

(22) Filed: Jun. 28, 2000

(51) Int. Cl.$^7$ .................................. F16K 3/04; E03B 5/00
(52) U.S. Cl. .................... 137/1; 137/613; 137/614.11; 137/565.23
(58) Field of Search ................ 137/613, 614.11, 137/614.21, 565.01, 565.23, 625.44, 625.45, 1; 251/129.11, 298, 301

(56) References Cited

U.S. PATENT DOCUMENTS

| | | |
|---|---|---|
| 1,483,081 * | 2/1924 | Dean .................................. 137/613 X |
| 2,749,082 | 6/1956 | Allen . |
| 2,850,260 | 9/1958 | Perazone et al. . |
| 3,120,944 | 2/1964 | Cogez et al. . |
| 3,557,822 | 1/1971 | Chronister . |
| 3,722,857 | 3/1973 | Townsend . |
| 3,854,696 | 12/1974 | Keyes et al. . |
| 3,973,753 | 8/1976 | Wheeler . |
| 4,044,993 | 8/1977 | Wheeler . |
| 4,052,036 | 10/1977 | Schertler . |
| 4,073,468 | 2/1978 | Erwin . |
| 4,088,301 | 5/1978 | Ehmig . |
| 4,089,505 | 5/1978 | Anderle et al. . |
| 4,136,854 | 1/1979 | Ehmig et al. . |
| 4,219,183 | 8/1980 | Hoffmann et al. . |
| 4,333,631 | 6/1982 | Bosch . |
| 4,395,049 | 7/1983 | Schertler . |
| 4,442,996 | 4/1984 | Erwin . |
| 4,458,905 | 7/1984 | Bosch . |
| 4,519,578 | 5/1985 | Boeckman et al. . |
| 4,524,796 * | 6/1985 | Ayers, Jr. et al. ............... 137/613 X |
| 4,627,567 | 12/1986 | Thorn . |
| 4,785,844 | 11/1988 | Pankov . |
| 4,921,213 | 5/1990 | Geiser . |
| 5,120,019 | 6/1992 | Davis, Jr. . |
| 5,314,164 | 5/1994 | Smith . |
| 5,330,157 | 7/1994 | Dern et al. . |
| 5,379,983 | 1/1995 | Geiser . |
| 5,577,707 | 11/1996 | Brida . |
| 5,873,562 | 2/1999 | Marugg . |
| 6,089,537 * | 7/2000 | Olmsted ........................... 251/129.11 |
| 6,161,576 * | 12/2000 | Maher et al. .................... 137/565.23 |

FOREIGN PATENT DOCUMENTS

| | | |
|---|---|---|
| 1190755 | 4/1965 | (DE) . |
| 1050435 | 12/1966 | (GB) . |

* cited by examiner

*Primary Examiner*—Kevin Lee
(74) *Attorney, Agent, or Firm*—McDermott, Will & Emery (57) ABSTRACT

A dual pendulum valve assembly including a housing having an interior space and first and second openings through which fluid can enter and exit the interior space; valve seats disposed in the interior space around the edges of the openings; and first and second pendulum valves for opening and closing, respectively, the first and second openings. Each pendulum valve is independently movable and includes a valve body mounted relative to the housing so that the valve body is movable between a completely opened position wherein fluid is allowed to pass through its respective opening and a completely closed position wherein the valve body seals the opening so that fluid can not pass therethrough. Each pendulum valve also includes a shaft fixedly coupled to the valve body through at least one pivot arm and at least partially mounted within the housing so that the valve body can rotate about a longitudinal axis of the shaft between a first angular position where the first valve body is in the completely opened position and a second angular position where the valve body is substantially axially aligned with its respective opening, and move substantially parallel to the longitudinal axis of the shaft, so that the valve body can move between the second angular position and the completely closed position as the pendulum valve continues to rotate. The present disclosure also provides a method of precisely controlling vacuum pressure within a process chamber of a semi-conductor wafer fabricator.

22 Claims, 10 Drawing Sheets

DUAL PENDULUM VALVE ASSEMBLY

FIELD OF THE DISCLOSURE

The present disclosure relates to gate valve assemblies, and more particularly to a dual pendulum valve assembly comprising a process chamber isolation valve and a vacuum pump isolation valve. The vacuum pump isolation valve is useful for isolating a vacuum pump coupled to the pendulum valve assembly so that the vacuum pump is not exposed to the atmosphere during cleaning of the pendulum valve assembly and process chamber.

BACKGROUND OF THE DISCLOSURE

A pendulum valve assembly generally includes a housing containing a pendulum valve and including an interior space and a pair of openings through which gaseous fluid can enter and exit the interior space. As its name implies, a pendulum valve pivots between open and closed positions, and includes a valve body, which is usually provided as a disk, connected to a rotatably shaft by a pivot arm. In a completely opened position the disk of the pendulum valve is moved out of the flow path defined by the openings so that fluid can enter and exit the interior space of the housing, while in a completely closed position the disk is moved into sealing contact with a valve seat surrounding one of the openings so that fluid can not enter the interior space.

The movement of the disk usually requires pivotal or rotational movement between a first angular position equal to the completely opened position and a second angular position, and then at least some translational movement from the second angular position into the completely closed position where the disk is in sealing contact with the valve seat. In order to obtain this combination of rotational and translational movement, prior pendulum valves have typically used multiple actuator elements which are inherently difficult to effect precise movement of the disk, and therefore more difficult to utilize for precise flow control purposes. For examples of such prior pendulum valves see the following: U.S. Pat. Nos. 2,850,260; 3,557,822; 3,722,857; 3,973,753; 4,052,036; 4,089,505; 4,333,631; 4,627,567; 4,785,844; 5,873,562; British Patent No. 1,050,435 and German Patent 1,190,755. Other valve structures are shown in U.S. Pat. Nos. 2,749,082; 3,854,696; 4,073,468; 4,088,301; 4,136,854; 4,395,049; 4,442,996; 4,458,905; 4,519,578; 4,921,213; 5,379,983; and 5,330,157.

U.S. patent application Ser. No. 09/339,084 discloses an improved pendulum valve assembly that is designed and constructed so as to eliminate the need for multiple actuator mechanisms. Instead, the improved pendulum valve assembly uses a simple rotating cam mechanism that precisely controls the rotational and axial movement of the valve body between a completely opened position and a completely closed position.

Pendulum valves are particularly useful in high purity gas delivery systems, such as those used in semiconductor manufacturing or other thin film coating processes performed at very low pressures (high vacuums), e.g., a pressure on the order of one torr or less. One ultra-high vacuum system adapted to operate at low conductances includes a vacuum pump separated from a process chamber by a pendulum valve, which helps control the pressure created in the process chamber by the vacuum pump within a predetermined range.

The process chamber of high purity gas delivery systems normally require cleaning after a given period of use. Such cleaning involves a physical scrubbing of the chamber surfaces and associated vacuum components, such as the pendulum valve that isolates the process chamber.

When the pendulum valve is cleaned it is necessary to shut down the vacuum pump and vent the entire system to atmosphere. Since the vacuum pump contains residues from the process conducted within the process chamber, venting to atmosphere exposes these residues to water vapor and other contaminants that may react with the residues to produce a corrosive agent that can lead to corrosion and premature failure of the vacuum pump. For example, using boron trichloride ($BCl_3$) to etch an aluminum layer produces a residue of aluminum trichloride ($AlCl_3$). When the aluminum trichloride residue reacts with water vapor in the atmosphere, an extremely corrosive hydrochloric acid (HCl) is produced.

As is known, such vacuum pumps are very expensive and difficult to replace. Accordingly there is a need for a device or means for isolating the vacuum pump from the atmosphere during cleaning of the process chamber and the pendulum valve.

SUMMARY OF THE DISCLOSURE

In accordance with the present disclosure, a dual pendulum valve assembly is provided for isolating the vacuum pump from the atmosphere during cleaning of the process chamber and the pendulum valve assembly. The dual pendulum valve assembly includes a housing having an interior space and first and second openings through which fluid can enter and exit the interior space; valve seats disposed in the interior space around the edges of the openings; and first and second pendulum valves for opening and closing, respectively, the first and second openings.

Each pendulum valve is independently movable and includes a valve body mounted relative to the housing so-that the valve body is movable within the interior space between a completely opened position wherein fluid is allowed to pass through its respective opening and a completely closed position wherein the valve body engages the valve seat around its respective opening and seals the opening so that fluid can not pass therethrough. Each pendulum valve also includes a shaft fixedly coupled to the valve body through at least one pivot arm and at least partially mounted within the housing so that the valve body can rotate about a longitudinal axis of the shaft between a first angular position where the first valve body is in the completely opened position and a second angular position where the valve body is substantially axially aligned with its respective opening, and move substantially parallel to the longitudinal axis of the shaft, so that the valve body can move between the second angular position and the completely closed position as the pendulum valve continues to rotate.

The dual pendulum valve assembly disclosed herein preferably utilizes simple rotating cam mechanisms that precisely controls the rotational and axial movement of the valve bodies between their completely opened and completely closed positions.

The present disclosure also provides a method of precisely controlling vacuum pressure within a process chamber of a semi-conductor wafer fabricator utilizing the dual pendulum valve. The method includes connecting the vacuum pump to the process chamber through the first and the second openings of the valve housing, respectively, and operating the vacuum pump to create a first pressure within the process chamber.

Then, the first valve body is moved to at least partially impede gaseous flow through the first opening, such that a second pressure within the process chamber is achieved. The second valve body is then substantially aligned with the second opening, such that a third pressure within the process chamber is achieved. Finally, the second valve body is laterally moved to substantially seal the second opening, such that a fourth pressure within the process chamber is maintained.

DETAILED DESCRIPTION OF THE DISCLOSURE

Figure 1:
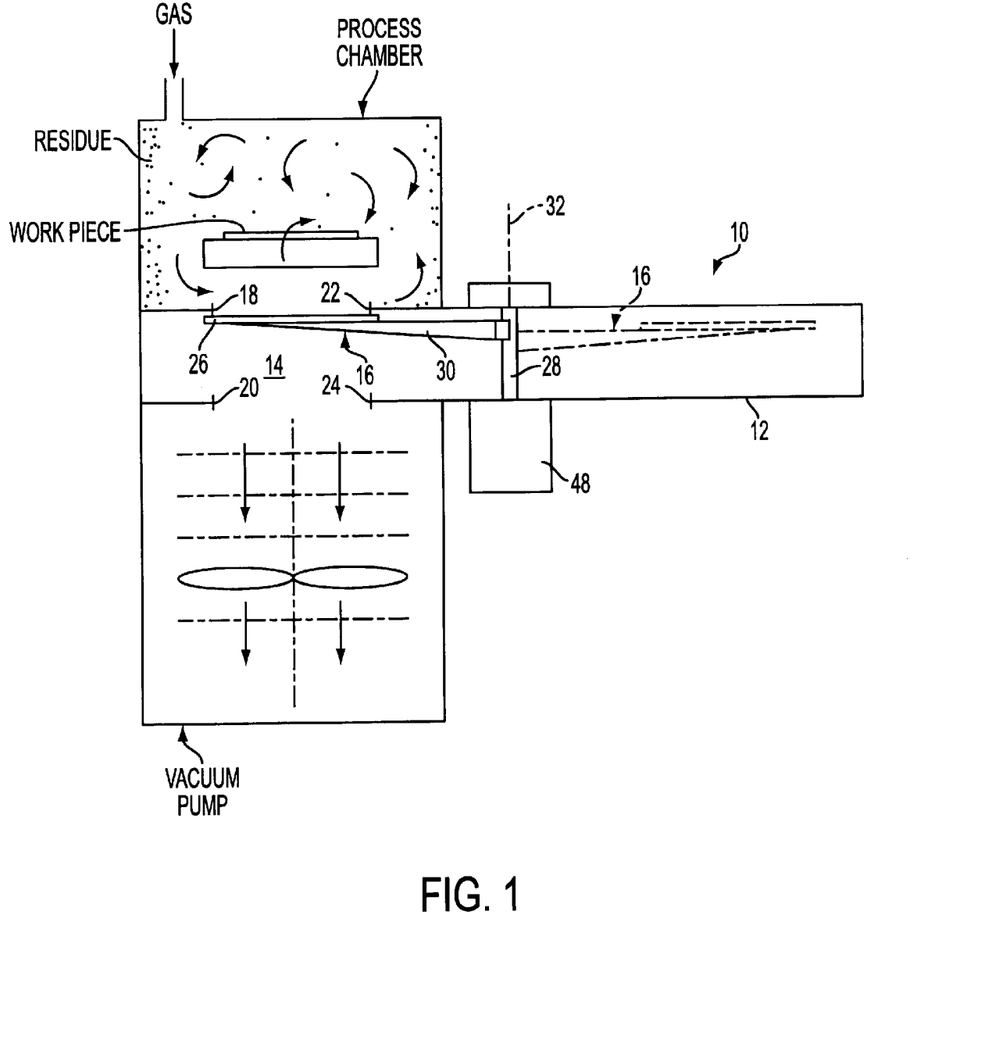
FIG. 1 is a schematic illustration of a portion of a high purity gas delivery system including a pendulum valve assembly having a disk movable between closed and open positions as shown.
Figure 2:
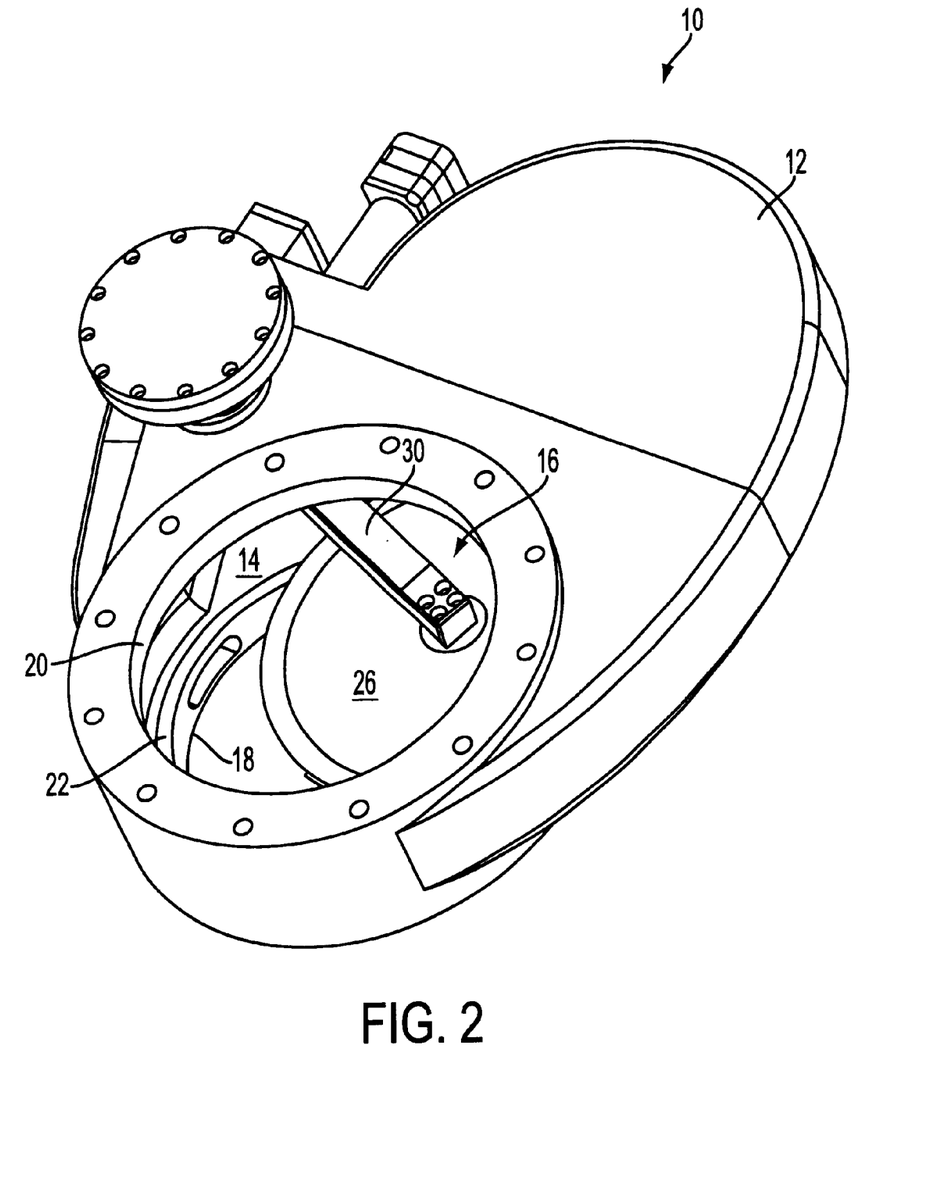
FIG. 2 is a perspective view of the pendulum valve assembly of FIG. 1.

Referring to FIG. 1, a pendulum valve assembly 10 generally includes a housing 12 defining an interior space 14 containing a pendulum valve 16 and having a pair of opposing openings 18, 20 through which gas can enter and exit the interior space. Valve seats 22, 24 are provided in the interior 14 of the housing 12 around edges of the openings 18, 20. As its name implies, the pendulum valve 16 pivots between open and closed positions, and includes a valve body, which is provided as a disk 26, connected to a rotatably shaft 28 by a pivot arm 30 extending laterally from the shaft.

As shown, the first of the openings 18 of the pendulum valve assembly 10 can, for example, be connected to a process chamber and a second of the openings 20 can be connected to a vacuum pump to form a portion of a high purity gas delivery system, such as those used in semiconductor manufacturing or other thin film coating processes performed at very low pressures (high vacuums), e.g., a pressure on the order of one torr or less. In general, a work piece is placed in the chamber, while a process gas is introduce into the chamber to chemically react with the work piece is a predetermined manner. The chemical reaction may produce a residue, as shown.

The pendulum valve assembly 10 helps control the flow of gas between the process chamber and the vacuum pump by controlling the position of the disk 26 between a completely opened position (as illustrated in broken lines) and a completely closed position (as illustrated in solid lines). When in the closed position the disk 26 comes into sealing contact with the valve seat 22 provided in the interior space 14 around the edge of the first opening 18.

A preferred pendulum valve assembly 10 is of the type described in U.S. patent application Ser. No. 09/339,084, entitled "Pendulum valve assembly", the disclosure in that application being incorporated herein in its entirety by reference. That pendulum valve assembly 10, which is also shown here in FIGS. 2–6, uses a simple rotating cam mechanism that precisely controls the rotational and axial movement of the valve body 26 between a completely opened position and a completely closed position.

Figure 3:
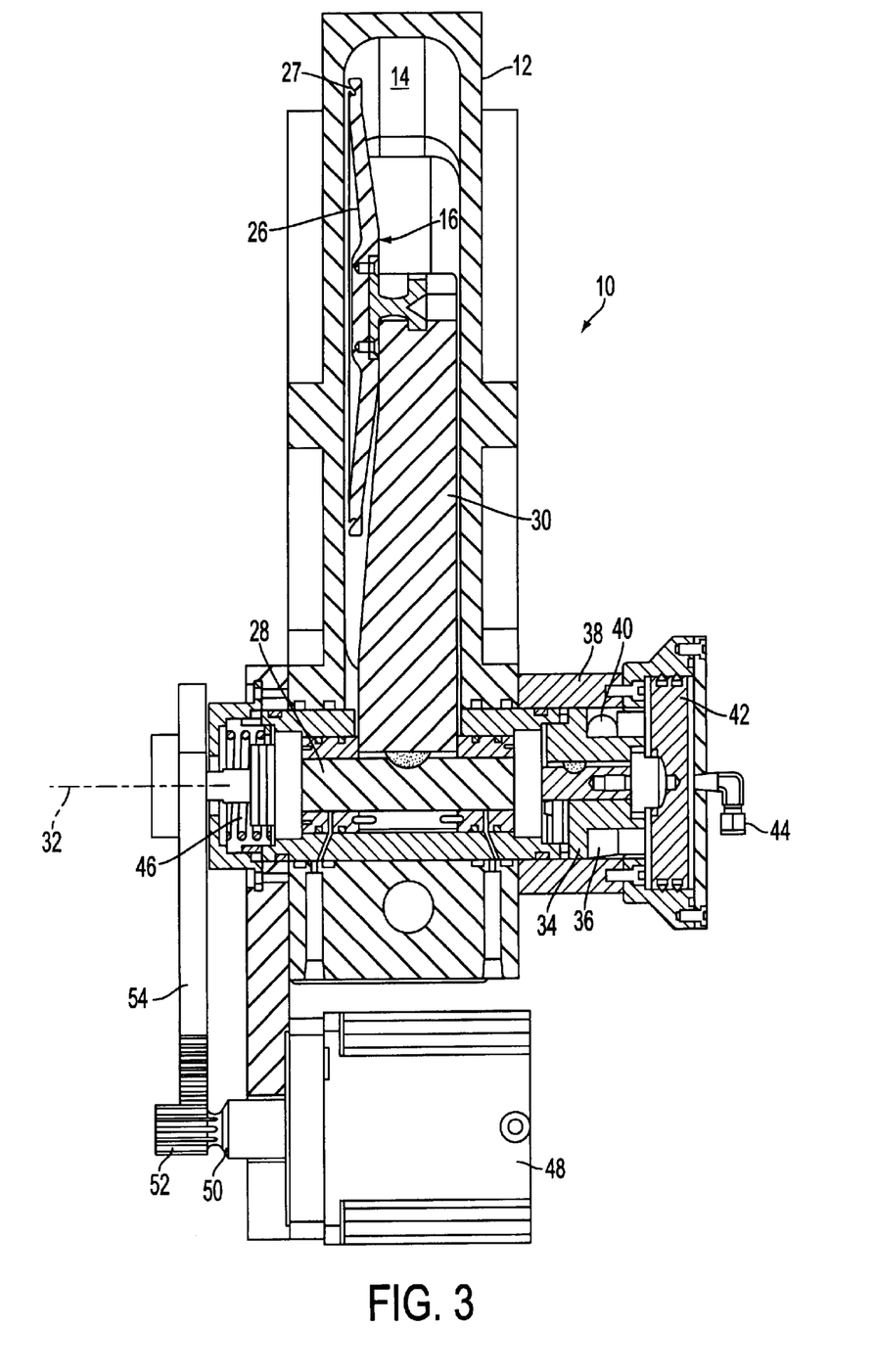
FIG. 3 is a sectional view of the pendulum valve assembly of FIG. 1 shown with a motor and gear mechanism attached thereto for moving the pendulum valve.
Figure 4:
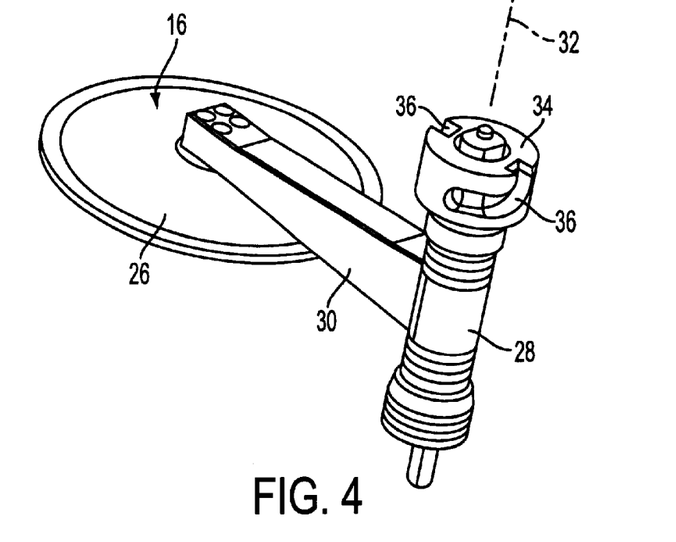
FIG. 4 is an isometric view of a pendulum valve and cam element of the pendulum valve assembly of FIGS. 1–3.
Figure 5:
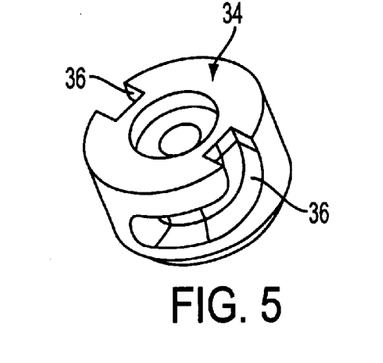
FIG. 5 is an isometric view of the cam element of the pendulum valve assembly of FIGS. 1–4.
Figure 6:
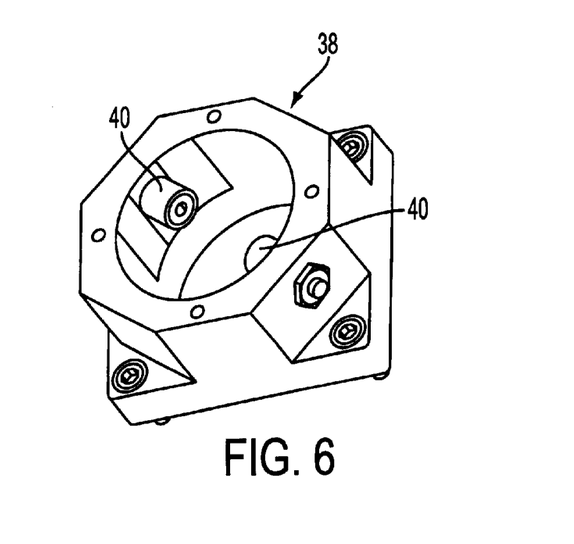
FIG. 6 is an isometric view of a cam follower support of the pendulum valve assembly of FIGS. 1–3 for interaction with the cam element.
Figure 7:
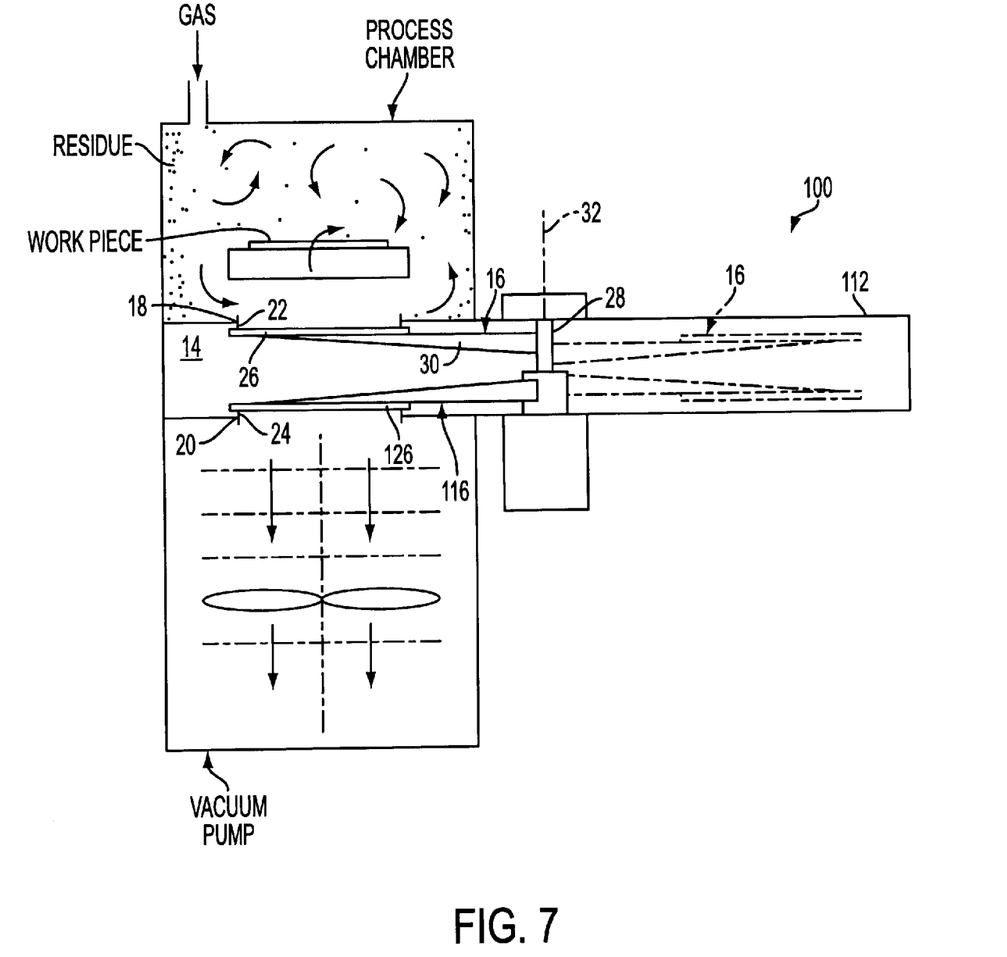
FIG. 7 is a schematic illustration of a portion of another high purity gas delivery system including a dual pendulum valve assembly according to the present disclosure having first and second disks movable between closed and open positions as shown.
Figure 8:
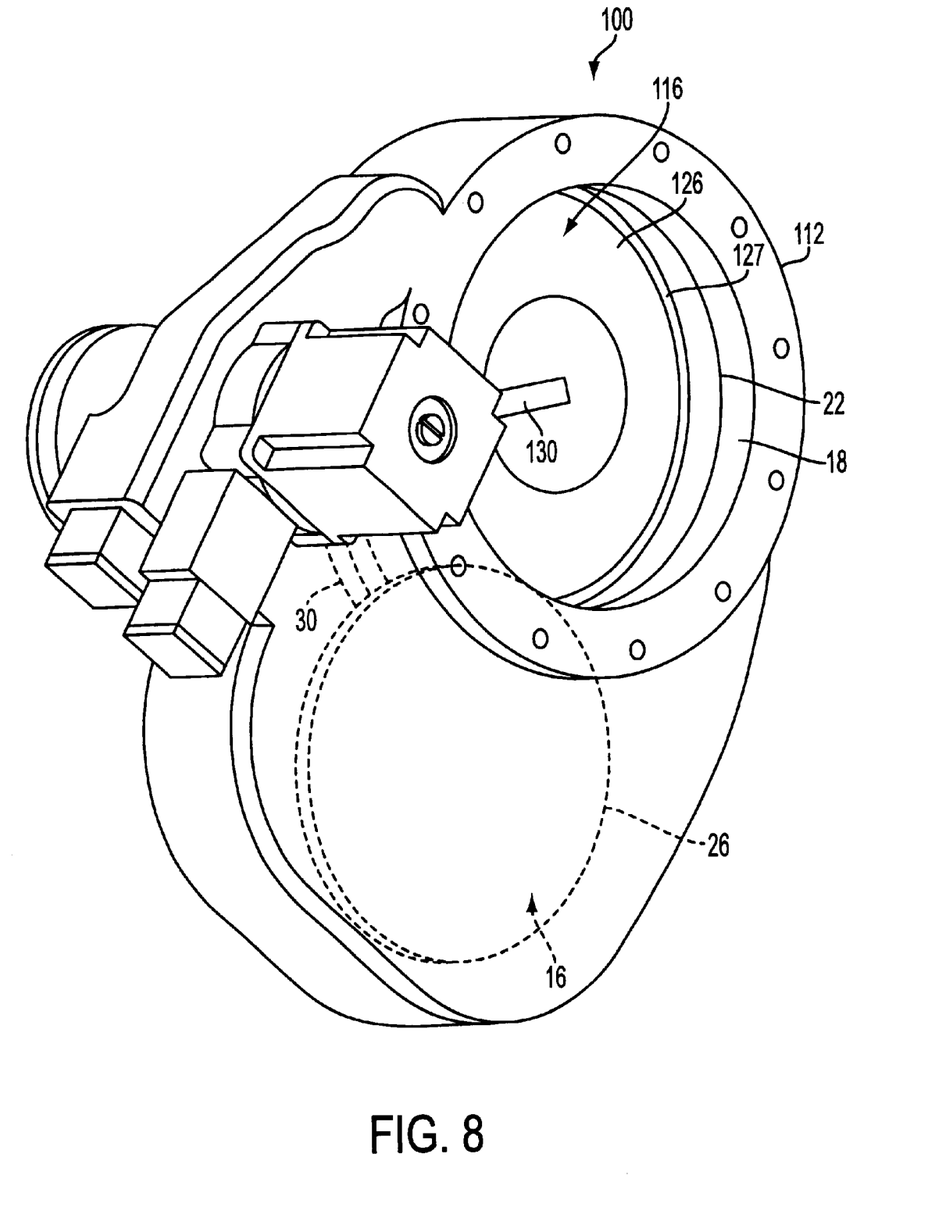
FIG. 8 is a perspective view of the dual pendulum valve assembly of FIG. 7.

Referring to FIGS. 1, 3 and 4, the longitudinal shaft 28 of the pendulum valve 16 is at least partially mounted within the housing 12 so as to be rotatable about its longitudinal axis 32 and movable axially along its longitudinal axis 32. The longitudinal shaft 28 is preferably fixedly attached at one end with a rotary cam element 34, as shown in FIGS. 3–4. The rotary cam element 34 has a cylindrical surface provided with slots 36 defining a cam surface, as shown in FIGS. 3–5. A cam roller collar 38, shown in FIGS. 3 and 6, is fixed to the housing 12 around the longitudinal shaft 28, and includes cam rollers 40 disposed within the slots 36 of the cam element 34.

As shown in FIG. 3, a pneumatic piston 42 provides a force on the shaft 28 in an axial direction so as to force the disk 26 towards its closed position when a pressurized gas is provided through port 44. A valve arrangement (not shown) can be connected to a source of pressurized gas (not shown) and to the port 44, so that the pressurized gas can be used to force the pneumatic piston 42 against the shaft 28 when closing the pendulum valve 16, and release the gas when opening the valve 16. The valve arrangement can be controlled by a switching device suitably positioned so as to be triggered when the pendulum valve 16 is moved. A spring 46 biases the pendulum valve 16 in an axial direction away from the first opening 18 in order to insure that the disk 26 will come free of the valve seat 22 when the pneumatic piston 42 is released.

The cam surfaces 36 of the cam element 34 allow the disk 26 to rotate in a plane parallel to the first opening 18, rotating from a first angular position equal to the fully open position of the disk 26 to a second angular position where the disk 26 is substantially aligned with the first opening 18. The disk 26 moves within the parallel plane because the slots 36 of the cam element 34 follow the cam rollers 40 in a purely rotational movement. However, when the disk 26 and the first opening 18 are substantially axially aligned, and the shaft 28 continues to rotate about its longitudinal axis, the cam surfaces 36 of the cam element 34 follow the rollers 40 so that the longitudinal shaft 28, pivot arm 30 and disk 26 also move parallel with the shaft axis 32 towards the first opening 18 until the disk 26 engages the valve seat 22. As shown, the disk 26 is provided with an o-ring 27 for providing a fluid-tight seal between the disk and the valve seat 22. The rotating cam mechanism provided at the rotation axis 32 of the disk 26 thus provides a simple arrangement for the rotational and axial closing of the pendulum valve 16.

In order to control the position of the disk 26, the assembly 10 is provided with a motor 48 and a gear mechanism mounted to the housing 12, as shown in FIG. 3. The motor 48 preferably is a reversible stepping motor and includes a motor shaft 50 that is fixed to, or otherwise provided with, a first rotary gear 52 of the gear mechanism. Gear mechanism also includes a second rotary gear 54 which rotates opposite to the rotational movement of the first rotary gear 52 when the motor 48 drives the gear in a rotational direction about the motor shaft 50. The second rotary gear 52 is fixed to an end of the longitudinal shaft 28 of the pendulum valve 16.

It should be appreciated that various changes can be made without departing from the scope of the pendulum valve assembly 10 as discussed thus far. For example, while the cam slots 36 are provided in the cam element 34 and fixed to the shaft 28, the arrangement can be reversed with the cam followers 40 being fixed to the shaft and the cam surfaces 36 fixed to the housing 12. In addition, while the second gear 54 is fixed to the shaft 28, and thus moves axially relative to the first gear 52 when the shaft moves along axis, the gears can be axially fixed relative to one another, and the shaft allowed to move axially relative to both. Also, the piston 42 and spring 46 can be reversed to spring-close the valve. Furthermore, it is understood that alternative suitable drive means, such as a pneumatic actuator and associated linkages, may be employed in place of the reversible stepping motor 48 and gear mechanism 52, 54 for driving the pendulum valve 16.

Referring now to FIGS. 7–10, a dual pendulum valve assembly 100 constructed in accordance with the present disclosure is shown. The assembly 100 is similar to the pendulum valve assembly 10 of FIGS. 1–6 and elements that are the same have the same reference numeral. The dual pendulum valve assembly 100 includes a second pendulum valve 116 for closing the second opening 20 and isolating the vacuum pump from the atmosphere during cleaning of the process chamber and the pendulum valve assembly 100. The second pendulum valve 116 also uses a simple rotating cam mechanism 136, 140 that precisely controls the rotational and axial movement of a valve body, which is provided as a disk 126, between a completely opened position and a completely closed position.

Figure 9:
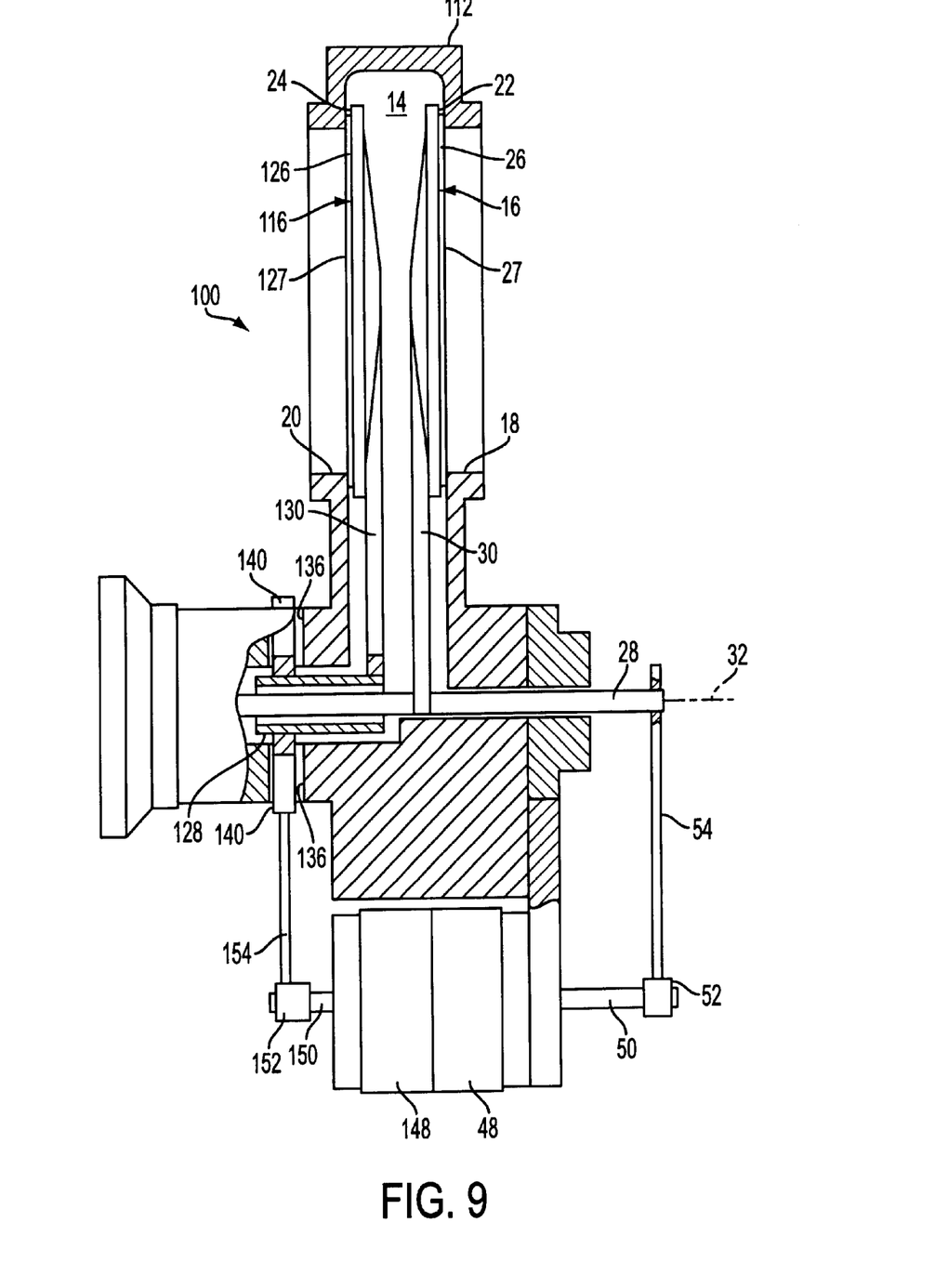
FIG. 9 is a side elevation view, partially in section, of the dual pendulum valve assembly of FIGS. 7–8 shown with motors and gear mechanisms attached thereto for independently moving the first and second disks of the assembly.
Figure 10:
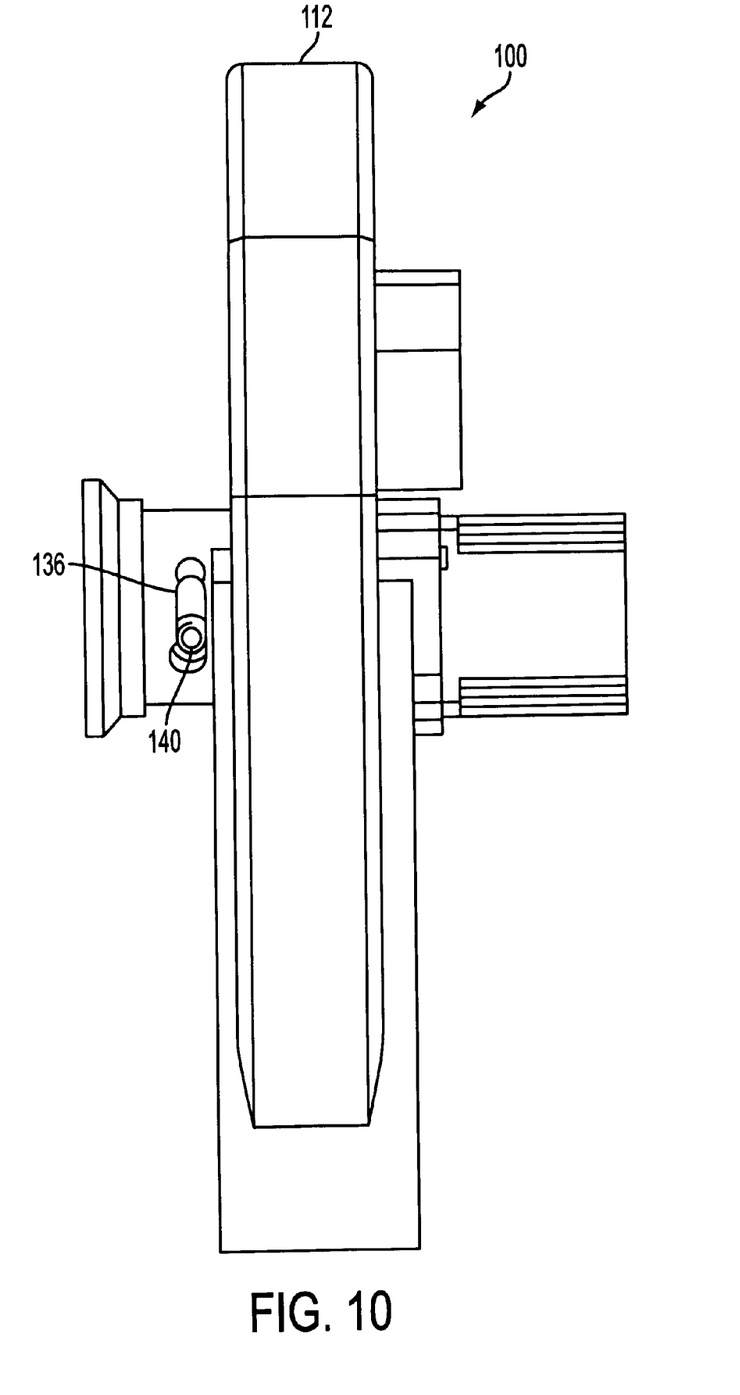
FIG. 10 is another side elevation view of the dual pendulum valve assembly of FIGS. 7–9.

Referring to FIG. 9, a longitudinal shaft 128 of the second pendulum valve 116, which is connected to the disk 126 by a pivot arm 130, is at least partially mounted within a housing 112 of the assembly so as to be rotatable about its longitudinal axis 132 and movable axially along its longitudinal axis 132. As shown, the shaft 128 of the second pendulum valve 116 is tubular and is coaxially received on the shaft 28 of the first pendulum valve 16 so that the shaft 128 can rotate and move axially with respect to the shaft 28 of the first pendulum valve 16 (i.e. the shafts move independently of one another).

Cam rollers 140 are fixed to the shaft 128, extend radially therefrom and are received in slots 136 in the housing 112 which define cam surfaces, as shown in FIGS. 3–5. The cam surfaces 136 of the housing 112 and cam rollers 140 of the second pendulum valve 116 allow the disk 126 to rotate in a plane parallel to the second opening 20, rotating from a first angular position equal to the fully open position of the disk 126 to a second angular position where the disk 126 is substantially aligned with the second opening 20. The disk 126 moves within the parallel plane because the cam rollers 140 of the shaft 128 follow the slots 136 of the housing 112 in a purely rotational movement. However, when the disk 126 and the second opening 20 are substantially axially aligned, and the shaft 128 continues to rotate about its longitudinal axis, the cam rollers 140 of the shaft 128 follow the slots 136 so that the shaft 128, pivot arm 130 and disk 126 also move parallel with the shaft axis 132 towards the second opening 20 until the disk 126 engages the valve seat 24. As shown, the disk 126 is provided with an o-ring 127 for providing a fluid-tight seal between the disk and the valve seat 24. The rotating cam mechanism provided at the rotation axis 132 of the disk 126 thus provides a simple arrangement for the rotational and axial closing of the second pendulum valve 116.

A second pneumatic piston (similar to the piston 44 of the first shaft 28) can be provided for forcing the shaft 128 of the second pendulum valve 116 in an axial direction and the disk 126 towards its closed position against the second valve seat 24 when a pressurized gas is applied to the piston. However, it has been found that the second pendulum valve 116 does not really need the assistance of such a piston arrangement since the vacuum created by the vacuum pump pulls the disk 126 into sealing engagement with the valve seat 24. A spring (similar to the spring 46 of the first shaft 28) may also be provided for biasing the second pendulum valve 116 in an axial direction away from the second opening 20 in order to insure that the disk 126 will come free of the valve seat 24 when the second opening is to be opened.

In order to control the position of the disk 126, the assembly 110 is provided with a second motor 148 and a gear mechanism mounted to the housing 112, as shown in FIG. 9. The motor 148 preferably is a reversible stepping motor and includes a motor shaft 150 that is fixed to, or otherwise provided with, a first rotary gear 152 of the gear mechanism. Gear mechanism also includes a second rotary gear 154 which rotates opposite to the rotational movement of the first rotary gear 152 when the motor 148 drives the gear in a rotational direction about the motor shaft 150. The second rotary gear 152 is fixed to an end of the longitudinal shaft 128 of the second pendulum valve 116.

It should be appreciated that various changes can be made without departing from the scope of the dual pendulum valve assembly 110 as disclosed herein. For example, while the cam slots 136 are provided in the housing 112 and the cam rollers 140 fixed to the shaft 128, the arrangement can be reversed with the cam followers 140 being fixed to the housing 112 and the cam surfaces 136 fixed to the shaft 128. In addition, while the second gear 154 is fixed to the shaft 128, and thus moves axially relative to the first gear 152 when the shaft moves along its axis, the gears can be axially fixed relative to one another, and the shaft allowed to move axially relative to both. Furthermore, alternative suitable drive means, such as a pneumatic actuator and associated linkages, may be employed in place of the reversible stepping motor 148 and gear mechanism 152, 154 for driving the second pendulum valve 116.

Figure 11:
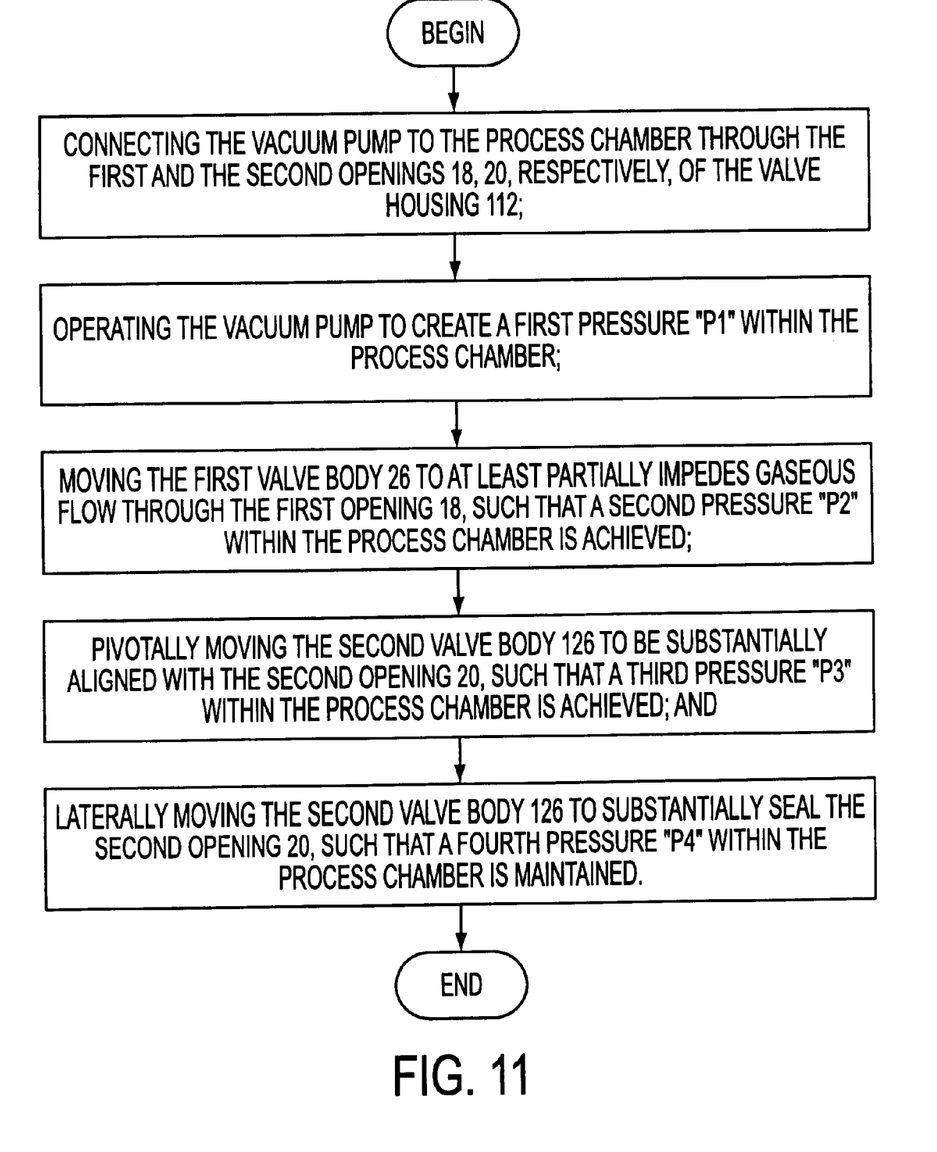
FIG. 11 is a flow chart illustrating a method of precisely controlling vacuum pressure within a process chamber of a semi-conductor wafer fabricator utilizing the dual pendulum valve of FIGS. 7–10.
Figure 12:
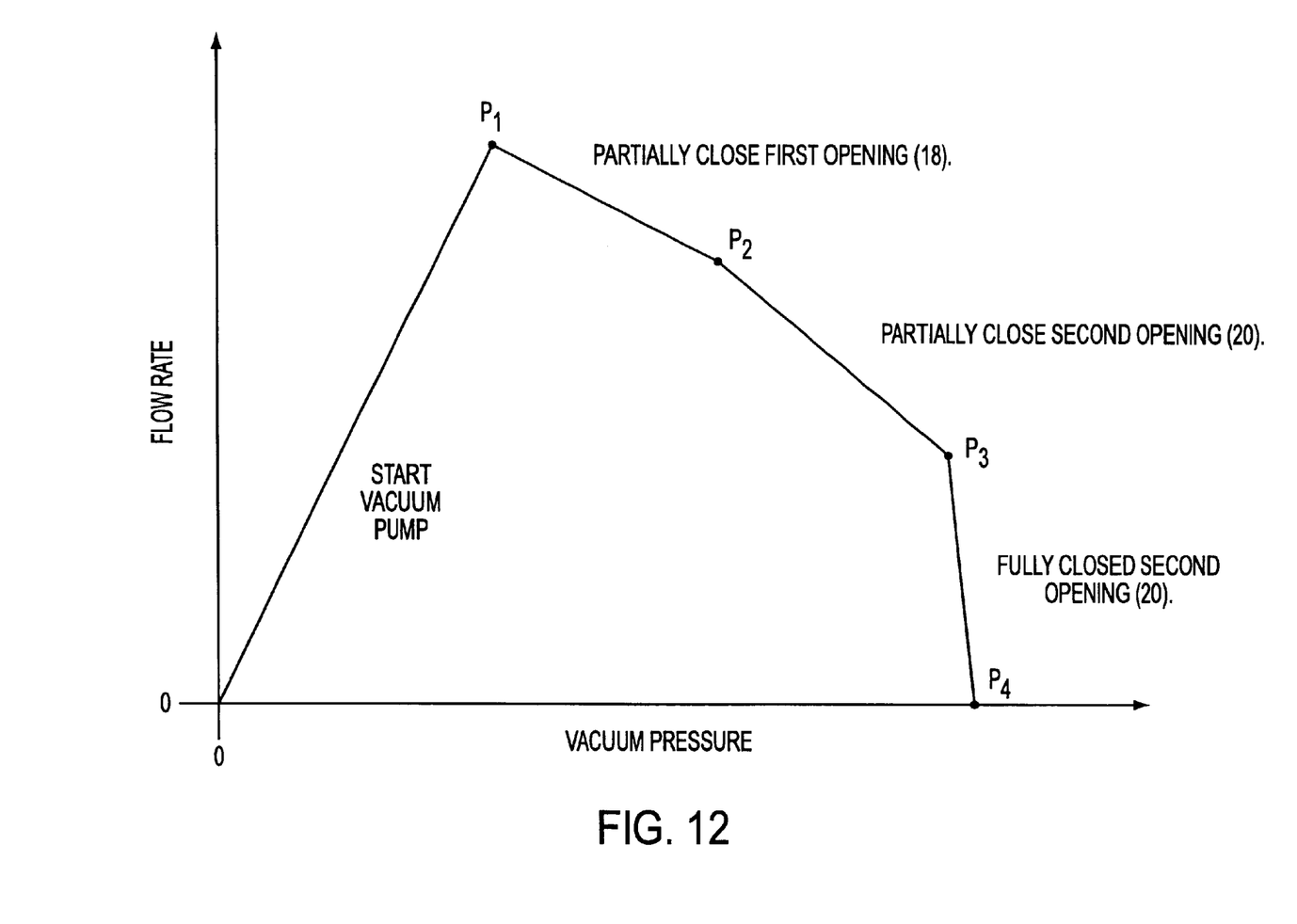
FIG. 12 is a graph of flow rate through the dual pendulum valve versus vacuum pressure within the process chamber, further illustrating the method of FIG. 11.

Referring now to FIGS. 11 and 12, the present disclosure also provides a method of precisely controlling vacuum pressure within the process chamber of a semi-conductor wafer fabricator utilizing the dual pendulum valve 100 of FIGS. 7 through 10. The method includes connecting the vacuum pump to the process chamber through the first and the second openings 18, 20, respectively, of the valve housing 112 and operating the vacuum pump to create a first pressure "$P_1$" within the process chamber.

Then, the first valve body 26 is moved to at least partially impede gaseous flow through the first opening 18, such that a second pressure "$P_2$" within the process chamber is achieved. The second valve body 126 is then substantially aligned with the second opening 20, such that a third pressure "$P_3$" within the process chamber is achieved. Finally, the second valve body 126 is laterally moved to substantially seal the second opening 20, such that a fourth pressure "$P_4$" within the process chamber is maintained.

Because certain changes may be made in the above apparatus without departing from the scope of the dual pendulum valve assembly herein disclosed, it is intended that all matter contained in the above description or shown in the accompanying drawings shall be interpreted in an illustrative and not a limiting sense.

What is claimed is:

1. A valve assembly comprising:
   a) a housing including an interior space and a pair of openings through which fluid can enter and exit the interior space;
   b) a first valve body movable within the interior space between a completely opened position allowing fluid to pass through a first of the openings and a completely closed position wherein the first valve body seals the first opening so that fluid can not pass therethrough; and
   c) a second valve body pivotally movable within the interior space between a completely opened position allowing fluid to pass through a second of the openings and a completely closed position wherein the second valve body seals the second opening so that fluid can not pass therethrough, wherein the second valve body pivots about a pivot axis substantially parallel with an axis of the second opening.

2. A valve assembly according to claim 1, further including an actuator for driving the second valve body between the completely opened and the completely closed positions.

3. A valve assembly according to claim 2, wherein the actuator comprises a reversible stepping motor.

4. A valve assembly according to claim 3, wherein the reversible stepping motor is coupled to the second valve body by a gear mechanism.

5. A valve assembly according to claim 4, wherein the motor includes a drive shaft, and the gear mechanism includes at least two gears, one fixed relative to the motor drive shaft and the other fixed relative to the second valve body, wherein the two gears are adapted to rotate and move longitudinally relative to one another.

6. A valve assembly according to claim 1, wherein each of the first and the second valve bodies comprise disks.

7. A valve assembly according to claim 6, wherein each of the first and the second disks are provided with 0-rings for sealing engagement with the interior of the housing around the openings.

8. A valve assembly according to claim 1, wherein the housing further includes valve seats disposed in the interior space around edges of the openings for receiving the valve bodies.

9. A valve assembly comprising:
   a housing including an interior space and a pair of openings through which fluid can enter and exit the interior space;
   a first valve body movable within the interior space between a completely opened position allowing fluid to pass through a first of the openings and a completely closed position wherein the first valve body seals the first opening so that fluid can not pass therethrough;
   a second valve body pivotally movable within the interior space between a completely opened position allowing fluid to pass through a second of the openings and a completely closed position wherein the second valve body seals the second opening so that fluid can not pass therethrough; and
   wherein the second valve body is pivotally movable between a first angular position where the second valve body is in the completely opened position, and a second angular position where the second valve body is substantially aligned with the second opening but spaced therefrom, and then movable between the second angular position and the completely closed position.

10. A valve assembly according to claim 2, further comprising a shaft fixedly coupled to the second valve body through a pivot arm extending generally laterally from the shaft, the shaft at least partially mounted within the housing to rotate about a longitudinal axis of the shaft and move substantially parallel to the longitudinal axis to allow the second valve body to rotate between the first angular position and the second angular position and move longitudinally between the second angular position and the completely closed position.

11. A valve assembly according to claim 10, further including a cam mechanism coupled between the shaft and the housing and arranged so as to control the longitudinal movement of the shaft.

12. A valve assembly according to claim 11, wherein the cam mechanism includes:
   a cam surface defined by the housing, and
   a cam follower fixed to the shaft and engaging the cam surface of the housing so as to define the movement of the shaft relative to the housing.

13. A valve assembly according to claim 10, further comprising a shaft fixedly coupled to the first valve body through a pivot arm extending generally laterally from said shaft, the shaft of the first valve body at least partially mounted within the housing to rotate about a longitudinal axis of said shaft.

14. A valve assembly according to claim 13, wherein the shaft of the second valve body is coaxially arranged with the shaft of the first valve body.

15. A valve assembly according to claim 14, wherein the shaft of the second valve body is tubular and received over the shaft of the first valve body for independent rotation with respect to the shaft of the first valve body.

16. A valve assembly comprising:
   a housing including an interior space and a pair of openings through which fluid can enter and exit the interior space;
   a first valve body movable within the interior space between a completely opened position allowing fluid to pass through a first of the openings and a completely closed position wherein the first valve body seals the first opening so that fluid can not pass therethrough;
   a second valve body pivotally movable within the interior space between a completely opened position allowing fluid to pass through a second of the openings and a completely closed position wherein the second valve body seals the second opening so that fluid can not pass therethrough;
   an actuator for driving the second valve body between the completely opened and the completely closed positions; and
   a separate actuator for driving the first valve body between the completely opened and the completely closed positions independently of the second valve body.

17. A method of precisely controlling vacuum pressure within a process chamber of a semi-conductor wafer fabricator, the method comprising:

connecting a vacuum pump to the process chamber through first and second openings, respectively, of a valve housing;

operating the vacuum pump to create a first pressure within the process chamber;

moving a first valve body to at least partially impedes gaseous flow through the first opening, such that a second pressure within the process chamber is achieved;

pivotally moving a second valve body to be substantially aligned with the second opening, such that a third pressure within the process chamber is achieved; and moving the second valve body to substantially seal the second opening, such that a fourth pressure within the process chamber is maintained.

18. A method of precisely controlling vacuum pressure according to claim 17, wherein the first valve body is pivotally moved to at least partially impede gaseous flow through the first opening.

19. A system used to perform thin film coating processes, comprising:

a process chamber;

a vacuum pump for creating a vacuum in the chamber; and a dual pendulum gate valve connected between the chamber and pump for controlling the vacuum pressure within the chamber, the dual pendulum gate valve including at least two valve bodies and structure for defining a fluid flow path, wherein at least one of the valve bodies pivots about a pivot axis so as to move substantially perpendicular to the fluid flow path.

20. A system according to claim 18, wherein the dual pendulum gate valve includes an interior, a first valve body for isolating the process chamber from the interior, and a second valve body for isolating the pump from the interior.

21. A system according to claim 19, wherein each body is movable independently of one another between an open position and a closed position.

22. A system according to claim 20, wherein the dual pendulum gate valve includes first and second openings defining, at least in part, the flow path through the interior between the chamber and the pump, the first and second valve bodies being each rotatable about an axis substantially parallel to the flow path from the open position to an intermediate position in the flow path, and axially translatable from the intermediate position to the closed position.

* * * * *

UNITED STATES PATENT AND TRADEMARK OFFICE
CERTIFICATE OF CORRECTION

PATENT NO. : 6,328,051 B1     Page 1 of 1
DATED : December 11, 2001
INVENTOR(S) : Joseph Maher It is certified that error appears in the above-identified patent and that said Letters Patent is hereby corrected as shown below:

<u>Column 8,</u>
Line 1, delete "claim 2", and insert therefor -- claim 9 --;

Signed and Sealed this

Fourteenth Day of May, 2002

Attest:

JAMES E. ROGAN
*Attesting Officer*     *Director of the United States Patent and Trademark Office*